United States Patent
Hirokawa et al.

(10) Patent No.: US 8,657,223 B2
(45) Date of Patent: Feb. 25, 2014

(54) WEBBING TAKE-UP DEVICE

(75) Inventors: Yusuke Hirokawa, Aichi-ken (JP);
Tomonori Nagata, Aichi-ken (JP)

(73) Assignee: Kabushiki Kaisha Tokai-Rika-Denki-Seisakusho, Aichi-Ken (JP)

(*) Notice: Subject to any disclaimer, the term of this patent is extended or adjusted under 35 U.S.C. 154(b) by 688 days.

(21) Appl. No.: 12/911,339

(22) Filed: Oct. 25, 2010

(65) Prior Publication Data

US 2011/0101143 A1    May 5, 2011

(30) Foreign Application Priority Data

Oct. 29, 2009    (JP) ................................. 2009-249034

(51) Int. Cl.
*B65H 75/38*    (2006.01)

(52) U.S. Cl.
USPC ........................................ 242/379; 242/379.2

(58) Field of Classification Search
USPC .............................................. 242/379, 379.2
See application file for complete search history.

(56) References Cited

U.S. PATENT DOCUMENTS

| | | | |
|---|---|---|---|
| 6,318,664 B1 * | 11/2001 | Sumiyashiki | 242/379 |
| 7,624,940 B2 * | 12/2009 | Kitazawa et al. | 242/374 |
| 2006/0186249 A1 * | 8/2006 | Kitazawa et al. | 242/379 |

FOREIGN PATENT DOCUMENTS

| | | |
|---|---|---|
| EP | 1679239 A1 | 7/2006 |
| JP | 2004-175279 A | 6/2004 |

OTHER PUBLICATIONS

European Search Report dated Feb. 7, 2011 in corresponding European Patent Application No. EP10188670.

* cited by examiner

*Primary Examiner* — Sang Kim
(74) *Attorney, Agent, or Firm* — Roberts Mlotkowski Safran & Cole, P.C.

(57) ABSTRACT

A webbing take-up device that can regulate displacement of a held part such as clutch while suppressing or preventing a drop in the assembly of the held part such as clutch. A projection is formed on a bridge portion in a wall portion on the opposite side of a holding portion side. When a cover plate is attached to a frame, a base portion of the cover plate contacts a distal end of the wall portion, but at the portion where the projection is formed, the based portion presses the projection and bends the bridge portion. By the bridge portion bending, a touching surface of the holding portion contacts a base portion of a clutch plate and regulates displacement of the clutch plate. Moreover, in a state where the bridge portion is not bending, a clearance is formed between the touching surface and the base portion when the clutch plate is disposed, so the clutch plate can be also be easily attached.

10 Claims, 6 Drawing Sheets

WEBBING TAKE-UP DEVICE

CROSS-REFERENCE TO RELATED APPLICATION

This application claims priority under 35 USC 119 from Japanese Patent Application No. 2009-249034 filed Oct. 29, 2009, the disclosure of which is incorporated by reference herein.

BACKGROUND OF THE INVENTION

1. Field of the Invention

The present invention relates to a webbing take-up device for taking up and storing a webbing belt that configures a seat belt device of a vehicle.

2. Related Art

In the webbing take-up device disclosed in Japanese Patent Application Laid-Open (JP-A) No. 2004-175279, when a pretensioner is actuated and a pinion rotates in the take-up direction, engagement teeth integrated with the pinion press meshing claws of a clutch plate and cause arm portions of the clutch plate to swing. Thus, the meshing claws bite into a knurled surface that is an inner peripheral surface of a knurled hole formed in a lock base, and the lock base and the pinion become mechanically coupled together via the clutch plate. In this manner, when the lock base and the pinion become mechanically coupled together via the clutch plate, the rotational force of the pinion that has rotated in the take-up direction because of the pretensioner is transmitted to a spool via the lock base. Thus, the rotational force rotates the spool in the take-up direction, whereby a webbing belt is taken up onto the spool, and the force with which the webbing belt restrains the body of the passenger increases.

Incidentally, in order to transmit the rotation of the pinion to the lock base, it is preferable for the area of contact between the knurled surface of the knurl hole and the meshing claws of the clutch plate to be large, and in this sense, it is preferable for displacement of the clutch plate in the direction where the meshing claws of the clutch plate escape from the knurled hole to be regulated.

In order to regulate such displacement of the clutch plate, for example, a configuration where an interfering piece that interferes with the clutch plate from the side of the clutch plate that is opposite the lock base side is disposed on a base member or the like that configures the webbing take-up device disclosed in JP-A No. 2004-175279 and where the interfering piece regulates displacement of the clutch plate by interfering with the clutch plate is conceivable.

However, the clutch plate would become unable to be easily assembled because the interfering piece would interfere with the clutch plate at the time when the clutch plate is assembled.

SUMMARY OF THE INVENTION

In consideration of the circumstances described above, it is an object of the present invention to obtain a webbing take-up device that can regulate displacement of a held part such as a clutch portion while suppressing or preventing a drop in the assembly of the held part such as the clutch portion with respect to a base member.

A webbing take-up device pertaining to a first aspect of the present invention is a webbing take-up device in which a spool to which a base end side of a webbing belt formed in a long band-like shape is connected rotates in a take-up direction that is one direction about an axis thereof such that the spool takes up the webbing belt from the base end side and stores the webbing belt, and in which a held part is disposed in a predetermined base member, the webbing take-up device including: a pair of leg portions that are disposed on the base member; a bridge portion that interconnects distal ends of the pair of leg portions and is capable of being deformed toward a base member side by a pressing force thereto from a side that is opposite from the base member; a holding portion that is disposed between the pair of leg portions and has a base end portion that is connected to the bridge portion and a distal end portion that opposes the held part, with a clearance of a predetermined size being formed between the distal end portion and the held part in a state where the pressing force is not being applied to the bridge portion; a pressing member that is attached to the base member or to a predetermined member to which the base member is attached, and that has a pressing portion that opposes the bridge portion from a side that is opposite from the holding portion in an attached state thereof; and a projecting portion that is formed projecting from one of the bridge portion or the pressing portion toward the other of the bridge portion or the pressing portion, that intervenes between the pressing portion and the bridge portion in the attached state of the pressing member and transmits the pressing force from the pressing portion to the bridge portion to cause the bridge portion to be bent such that the distal end portion of the holding portion approaches the held part.

In the webbing take-up device pertaining to the first aspect of the present invention, the held part is disposed in the predetermined base member that configures the device. Moreover, the pair of leg portions are disposed on the base member. The distal end portions of the pair of leg portions are interconnected by the bridge portion. Further, the base end of the holding portion disposed between the pair of leg portions is connected to the bridge portion, and the distal end of the holding portion opposes the held part.

Here, in the state where the pressing force is not being applied to the bridge portion, the predetermined clearance is formed between the distal end portion of the holding portion and the held part. Due to the clearance being formed, the held part can be easily disposed in a predetermined position.

In this manner, in a state where the held part has been disposed so as to oppose the distal end portion of the holding portion in the predetermined position with respect to the base member, when the pressing member is attached to the base member or to the predetermined member to which the base member is attached, the pressing portion of the pressing member and the bridge portion oppose each other.

Here, the projecting portion is disposed on either one of the pressing portion of the pressing member or the bridge portion so as to project toward the other, so at the site where the projecting portion is disposed, the projecting portion is intervened between the pressing portion of the pressing member and the bridge portion. For this reason, at the site where the projecting portion intervenes between the pressing portion of the pressing member and the bridge portion, the bridge portion becomes curved toward the side of the held part by the pressing force from the pressing portion by an amount corresponding to the projecting portion. Thus, the distal end portion of the holding portion approaches the held part, so if the held part tries to displace toward the distal end sides of the leg portions, the distal end portion of the holding portion interferes with the held part, and displacement of the held part is prevented or suppressed.

A webbing take-up device pertaining to a second aspect of the present invention includes: a spool to which a base end side of a webbing belt formed in a long band-like shape is connected and which rotates in a take-up direction that is one direction about an axis thereof to thereby take up the webbing belt from the base end side and store the webbing belt; a clutch portion that is disposed so as to be capable of relative rotation with respect to the spool and that is coupled directly or indirectly to the spool by rotating in a predetermined direction to apply a rotational force in the take-up direction to the spool; a pretensioner that causes the clutch portion to rotate in the predetermined direction by being actuated; a frame that directly or indirectly supports the pretensioner and the spool; a pair of leg portions that are disposed upright toward one side in an axis-of-rotation direction of the clutch portion and sideward in a radius-of-rotation direction of the clutch portion; a bridge portion that interconnects distal ends in the upright direction of the leg portions and is capable of being bent-deformed by receiving an external force in a direction from the distal end sides toward base end sides of the leg portions; a holding portion that is disposed between the pair of leg portions and has a base end portion that is integrally connected to the bridge portion and a distal end portion that opposes an end portion in axial direction of the clutch portion, with a clearance of a predetermined size being formed between the distal end portion and the end portion in the axial direction of the clutch portion in a state where the external force is not being applied to the bridge portion; a pressing member that is attached to the frame and has a pressing portion that opposes the bridge portion from a side that is opposite from the holding portion in a state where the pressing member is attached to the frame; and a projecting portion that is formed projecting from one of the bridge portion or the pressing portion toward the other of the bridge portion or the pressing portion, that intervenes between the pressing portion and the bridge portion in the attached state of the pressing member and transmits the pressing force from the pressing portion to the bridge portion to cause the bridge portion to be bent such that the distal end portion of the holding portion approaches the clutch portion.

In the webbing take-up device pertaining to the second aspect of the present invention, when the pretensioner is actuated, the clutch portion is caused to rotate in the take-up direction by the pretensioner. When the clutch portion rotates in the predetermined direction in this manner, the clutch portion becomes directly or indirectly coupled to the spool, the rotation of the clutch portion is transmitted to the spool as a rotational force in the take-up direction, and the spool is forcibly caused to rotate in the take-up direction. In this manner, when the spool rotates in the take-up direction, the webbing belt worn on the body of the passenger is taken up from the base end side onto the spool, so the restraining force of the webbing belt with respect to the body of the passenger increases.

Incidentally, the pair of leg portions are disposed upright toward one axis-of-rotation direction side of the clutch portion at the side portion in the radius-of-rotation of the clutch portion, and the upright direction distal end portions of the leg portions are interconnected by the bridge portion. Moreover, the holding portion is disposed between the pair of leg portions. The base end portion of the holding portion is connected to the bridge portion, and the distal end portion of the holding portion opposes the clutch portion.

Here, in the state where the pressing force is not being applied to the bridge portion, the predetermined clearance is formed between the distal end portion of the holding portion and the clutch portion. Because the clearance is formed, the clutch portion can be easily disposed in a predetermined position.

In this manner, in a state where the clutch portion has been disposed so as to oppose the distal end portion of the holding portion in the predetermined position, when the pressing member is attached to the frame, the pressing portion of the pressing member and the bridge portion oppose each other. Here, the projecting portion is disposed on one of the pressing portion of the pressing member or the bridge portion so as to project toward the other, so at the site where the projecting portion is disposed, the projecting portion is intervened between the pressing portion of the pressing member and the bridge portion.

For this reason, at the site where the projecting portion intervenes between the pressing portion of the pressing member and the bridge portion, the bridge portion becomes curved toward the side of the clutch portion by the pressing force from the pressing portion by an amount corresponding to the projecting portion. Thus, the distal end portion of the holding portion approaches the clutch portion, so when the clutch portion tries to displace toward the distal end sides of the leg portions, the distal end portion of the holding portion interferes with the clutch portion, and displacement of the clutch portion is prevented or suppressed.

A webbing take-up device pertaining to a third aspect of the present invention is the webbing take-up device pertaining to the second aspect of the present invention, wherein the distal end portion of the holding portion is configured as a curved surface that curves so as to overhang toward a side of the clutch portion.

In the webbing take-up device pertaining to the third aspect of the present invention, the distal end portion of the holding portion is configured as a curved surface that curves so as to overhang out toward the clutch portion side. For this reason, the contact between the distal end portion of the holding portion and the clutch portion becomes linear contact or point contact, and frictional resistance that arises between the distal end portion of the holding portion and the clutch portion when the clutch portion rotates can be made small.

A webbing take-up device pertaining to a fourth aspect of the present invention is the webbing take-up device pertaining to the second aspect or the third aspect of the present invention, further includes a case that has a base portion directly or indirectly attached to the frame and a wall portion disposed upright from the base portion so as to be away from the frame along the axis-of-rotation direction of the clutch portion, with the clutch portion being housed inside the case, wherein a through hole that penetrates the wall portion in the radius-of-rotation direction of the clutch portion is formed, the wall portion on one side of the through hole in a circumference-of-rotation direction of the clutch portion is configured as one of the pair of leg portions, the wall portion on another side of the through hole in the circumference-of-rotation direction of the clutch portion is configured as the other of the pair of leg portions, a portion of the wall portion on a side that is opposite from the base portion with respect to the through hole is configured as the bridge portion, and the holding portion is disposed inside the through hole.

In the webbing take-up device pertaining to the fourth aspect of the present invention, the base portion of the case is directly or indirectly attached to the frame, and the clutch portion is housed inside the case. Here, the through hole that penetrates the wall portion of the case in the wall portion in the radius-of-rotation direction of the clutch portion is formed. Due to the through hole being formed in the wall portion, the wall portion on one side of the through hole in the circumference-of-rotation direction of the clutch portion becomes one of the pair of leg portions, the wall portion on the other side of the through hole in the circumference-of-rotation direction of the clutch portion becomes the other of the pair of leg portions, the portion of the wall portion on the opposite side of the base portion with respect to the through hole becomes the bridge portion, and the holding portion is disposed inside the through hole.

In this manner, the pair of leg portions and the bridge portion are configured by the wall portion of the case, so an increase in the number of parts can be suppressed. In a configuration where the leg portions and the bridge portion are disposed separately from the wall portion, space for disposing the leg portions and the bridge portion is necessary, but in a case where the pair of leg portions and the bridge portion are configured by the wall portion of the case, special space for disposing the leg portions and the bridge portion becomes unnecessary.

A webbing take-up device pertaining to a fifth aspect of the present invention is the webbing take-up device pertaining to any one of the second aspect to the fourth aspect of the present invention, further includes: a case that has a base portion directly or indirectly attached to the frame and a wall portion disposed upright from the base portion so as to be away from the frame along the axis-of-rotation direction of the clutch portion, with the clutch portion being housed inside the case; and a cover that covers at least a part of the case from a side of the case that is opposite from the frame, that opposes the bridge portion from a side of the bridge portion that is opposite from the holding portion, and that applies to the bridge portion the pressing force that causes the bridge portion to be bent in a state where the cover is attached to the frame, wherein the cover is configured as the pressing member.

In the first to fifth aspects, it is possible that, in the attached state of the pressing member, the distal end portion of the holding portion contacts the held part (the clutch portion).

Further, in the first to fifth aspects, it is possible that a dimension of the projecting portion in an upright direction of the pair of leg portions is substantially equal to a dimension of a clearance in the upright direction of the pair of leg portions in the state where the pressing force is not being applied to the bridge portion.

In the webbing take-up device pertaining to the fifth aspect of the present invention, the base portion of the case is directly or indirectly attached to the frame, the clutch portion is housed inside the case, and the case is covered by the cover.

Here, in the webbing take-up device pertaining to the fifth aspect of the present invention, the cover presses the bridge portion via the projecting portion and causes the bridge portion to be bent, so an increase in the number of parts can be suppressed, and special space for disposing the pressing member separately from the cover becomes unnecessary.

As described above, in the webbing take-up device pertaining to the present invention, a held part such as a clutch portion can be easily disposed in a predetermined position, and displacement of the held part such as the clutch portion that has been disposed in the predetermined position in this manner can be prevented or suppressed.

BRIEF DESCRIPTION OF THE DRAWINGS

An embodiment of the invention will be described in detail with reference to the following figures, wherein.

DETAILED DESCRIPTION OF THE INVENTION

<Configuration of Embodiment>

Figure 3:
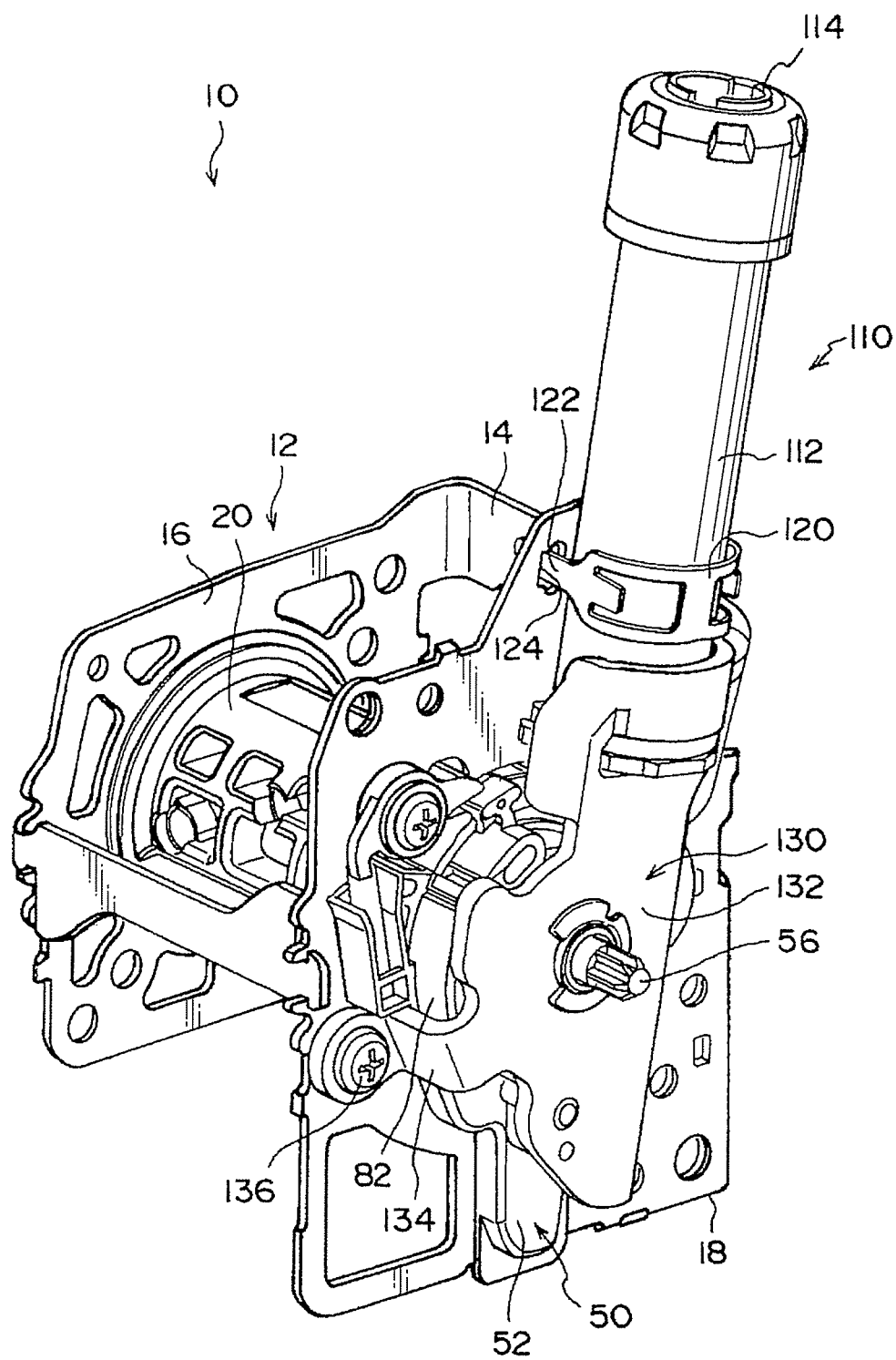
FIG. 3 is a perspective view showing the configuration of the webbing take-up device pertaining to the embodiment of the present invention.

In FIG. 3, the configuration of a webbing take-up device 10 pertaining to an embodiment of the present invention is shown by way of a perspective view.

As shown in FIG. 3, the webbing take-up device 10 is equipped with a frame 12. The frame 12 is equipped with a substantially plane shape rear plate 14. A plane shape leg plate 16 extends out from one width direction end portion of the rear plate 14 toward one side in the thickness direction of the rear plate 14. A leg plate 18 extends out from the other width direction end portion of the rear plate 14 in the direction in which the leg plate 16 extends out from the rear plate 14, so that, overall, the frame 14 is formed in a general U-shape where the leg plate 16 and the leg plate 18 oppose each other in the width direction of the rear plate 14.

A spool 20 is disposed between the leg plate 16 and the leg plate 18 of the frame 12. The spool 20 is configured in a substantially circular column-like shape whose axial direction is along the direction in which the leg plate 16 and the leg plate 18 oppose each other. A longitudinal direction base end side of a long band-like webbing belt (not shown) is connected to the spool 20. The webbing belt is pulled out from the spool 20 in a direction above the frame 12 (upward in FIG. 3), and when the spool 20 rotates in a take-up direction that is one direction about its central axis, the webbing belt is taken up from the longitudinal direction base end side and stored on the outer peripheral portion of the spool 20.

Figure 4:
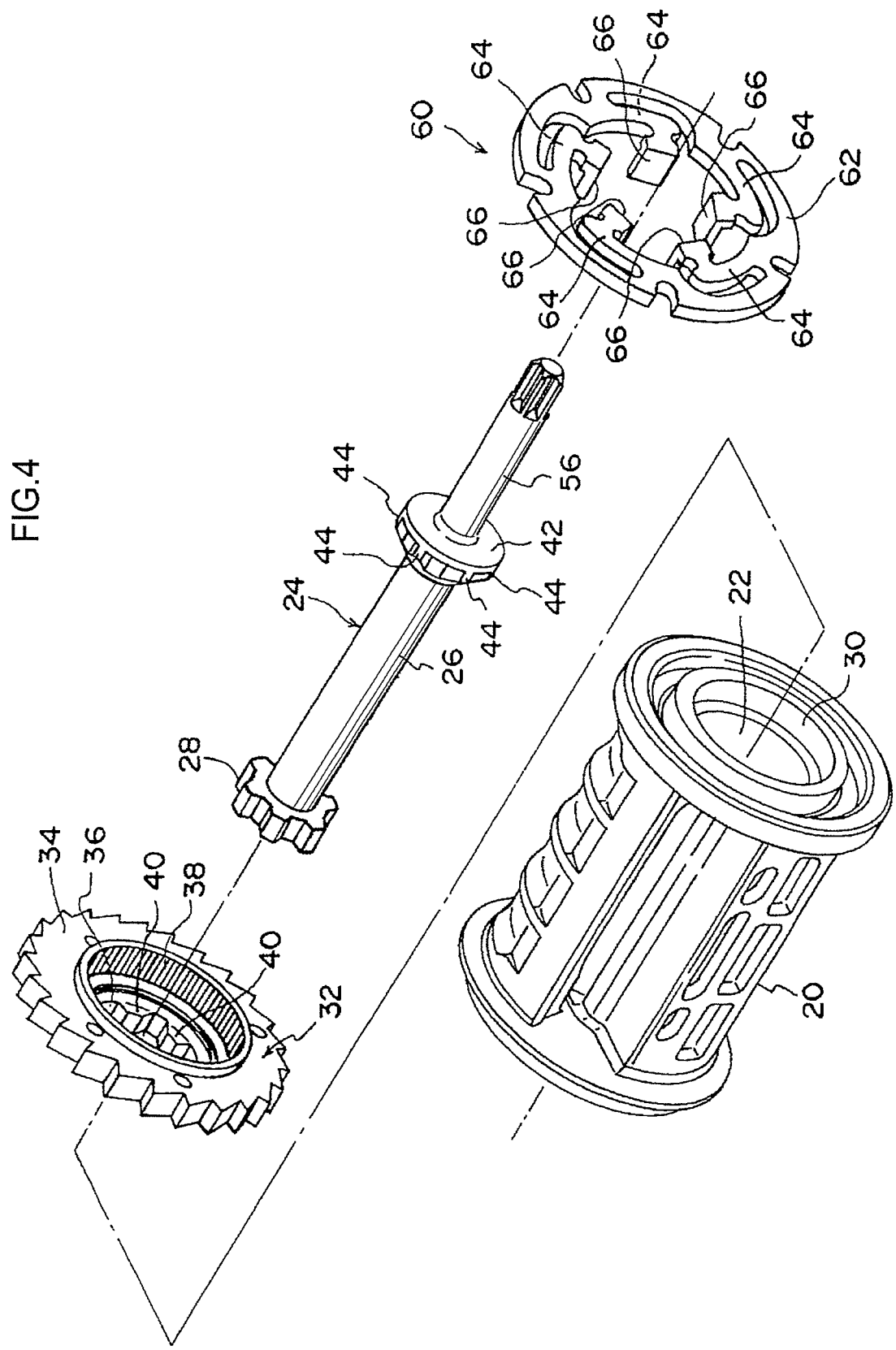
FIG. 4 is an exploded perspective view showing the configuration of a spool, and the neighborhood of the spool, of the webbing take-up device pertaining to the embodiment of the present invention.

Further, as shown in FIG. 4, a through hole 22 is formed in the spool 20. The cross-sectional shape of the through hole 22 is configured in a circular shape that is substantially coaxial with respect to the spool 20. A torsion shaft 24 is placed inside the through hole 22. The torsion shaft 24 is equipped with a rod-shaped shaft body 26 that is coaxial with respect to the spool 20. A spool-side coupling portion 28 is formed on the end portion of the shaft body 26 on the leg plate 16 side in the axial direction. The outer peripheral shape of the spool-side coupling portion 28 is sufficiently larger than the outer peripheral shape of the shaft body 26, and the shape of the spool-side coupling portion 28 is configured in a noncircular shape such as a polygonal shape, like a hexagonal shape or an octagonal shape, or a star shape.

A fitting insertion hole whose inner peripheral shape corresponds to the outer peripheral shape of the spool-side coupling portion 28 is formed in the leg plate 16 side of the spool 20 in correspondence to the spool-side coupling portion 28. The fitting insertion hole is communicated with the through hole 22, and the spool-side coupling portion 28 of the torsion shaft 24 placed inside the through hole 22 fits into the fitting insertion hole. Thus, the spool 20 and the torsion shaft 24 are interconnected in a state where relative rotation of the torsion shaft 24 with respect to the spool 20 is impossible.

Further, a lock base mounting hole 30 is formed in the neighborhood of the end portion of the spool 20 on the leg plate 18 side. The inner diameter dimension of the lock base mounting hole 30 is larger than the inner diameter dimension of the through hole 22, the lock base mounting hole 30 is configured in a circular shape that is coaxial with respect to the through hole 22, and the end portion of the through hole 22 on the leg plate 18 side opens at the bottom portion of the lock base mounting hole 30. A lock base 32 that configures a lock mechanism is mounted in the lock base mounting hole 30. The lock base 32 is equipped with a ratchet portion 34. The outer peripheral shape of the ratchet portion 34 is configured in an outer-toothed ratchet shape that is sufficiently larger than the inner peripheral shape of the lock base mounting hole 30, and the ratchet portion 34 is placed opposing the end portion of the spool 20 on the leg plate 18 side.

An unillustrated fitting insertion portion is formed coaxially with respect to the lock base 32 on the end portion of the lock base 32 on the spool 20 side. The outer peripheral shape of the fitting insertion portion of the lock base 32 is configured in a circular shape that is substantially equal to the inner peripheral shape of the lock base mounting hole 30, and the fitting insertion portion of the lock base 32 is fittingly inserted into the lock base mounting hole 30 from the open end of the lock base mounting hole 30 on the opposite side of the through hole 22 side. In contrast to the spool-side coupling portion 28 and the fitting insertion hole into which the spool-side coupling portion 28 is fittingly inserted, the inner peripheral shape of the lock base mounting hole 30 and the outer peripheral shape of the fitting insertion portion of the lock base 32 that is fitted into the lock base mounting hole 30 are circular, so even in a state where the fitting insertion portion of the lock base 32 has been fitted into the lock base mounting hole 30, the lock base 32 is capable of relative rotation coaxially with respect to the spool 20.

Further, a fit-together hole 36 is formed coaxially with respect to the lock base 32 and with respect to the spool 20 on the spool 20 side which is from the axial direction intermediate portion of the lock base 32, and a knurled hole 38 is formed coaxially with respect to the lock base 32 and with respect to the spool 20 on the side from the axial direction intermediate portion of the lock base 32 that is opposite the spool 20 side. The fit-together hole 36 and the knurled hole 38 are communicated with each other, and the shaft body 26 of the torsion shaft 24 passes through the fit-together hole 36 and the knurled hole 38. Plural fit-together pieces 40 are formed projecting from the inner peripheral portion of the fit-together hole 36 toward the center side of the fit-together hole 36.

A fit-together portion 42 is formed on the torsion shaft 24 in correspondence to the fit-together hole 36. The fit-together portion 42 is equipped with plural fit-together projections 44 that are formed projecting radially outward in the radial direction of the shaft body 26 with respect to the central axis of the shaft body 26. The fit-together projections 44 correspond to gaps between the fit-together pieces 40 that are adjacent in the circumferential direction in the fit-together hole 36, and the fit-together projections 44 fit into the gaps between the fit-together pieces 40, whereby relative rotation of the lock base 32 with respect to the torsion shaft 24 is regulated.

The lock base 32 whose fitting insertion portion has been fittingly inserted into the lock base mounting hole 30 is capable of relative rotation with respect to the spool 20.

However, as described above, the torsion shaft 24 whose spool-side coupling portion 28 has been fitted into the fitting insertion hole in the spool 20 is incapable of relative rotation with respect to the spool 20, so the lock base 32 whose relative rotation with respect to the torsion shaft 24 is regulated is connected to the spool 20 such that the lock base 32 is incapable of relative rotation with respect to the spool 20 via the torsion shaft 24.

Here, the torsion shaft 24 and the lock mechanism configured to include the lock base 32 will be briefly described. When the spool 20 suddenly rotates in a pull-out direction that is the opposite of the take-up direction as a result of the vehicle suddenly decelerating or the webbing belt being suddenly pulled out, a lock pawl (not shown) that is disposed so as to be swingable about an axis whose axial direction is the same direction as the central axis of the spool 20 in the neighborhood of the leg plate 18 is caused to swing, and the lock pawl meshes with the outer teeth of the ratchet portion 34 of the lock base 32.

Thus, rotation of the lock base 32 in the pull-out direction is regulated. As described above, the lock base 32 is connected so as to be incapable of relative rotation via the torsion shaft 24, so rotation of the lock base 32 in the pull-out direction is regulated, whereby rotation of the spool 20 in the pull-out direction is regulated and pulling-out of the webbing belt from the spool 20 is regulated. Thus, the webbing belt strongly restrains the body of the passenger wearing the webbing belt.

Further, when the body of the passenger pulls the webbing belt with a force exceeding the mechanical strength of the shaft body 26 of the torsion shaft 24 in a state where rotation of the lock base 32 in the pull-out direction is being regulated in this manner, torsional deformation arises in the shaft body 26 between the spool-side coupling portion 28, to which a rotational force in the pull-out direction is applied via the spool 20, and the fit-together portion 42, whose rotation in the pull-out direction is being regulated via the lock base 32. The spool 20 rotates in the pull-out direction by an amount corresponding to the torsional deformation in the shaft body 26 to allow the webbing belt to be pulled out from the spool 20, and part of the tensile load applied to the webbing belt by the body of the passenger is supplied to the torsional deformation of the shaft body 26 such that part of the tensile load is absorbed.

An unillustrated spring case is attached to the leg plate 16 on the outside of the leg plate 16 shown in FIG. 3 (on the side of the leg plate 16 that is opposite the leg plate 18 side). An unillustrated shaft portion disposed coaxially with respect to the spool 20 on the end portion of the spool 20 on the leg plate 16 side is supported such that it freely rotates in the spring case, and the shaft portion is urged in the take-up direction by a spring serving as spool urging means disposed inside the spring case.

Figure 1:
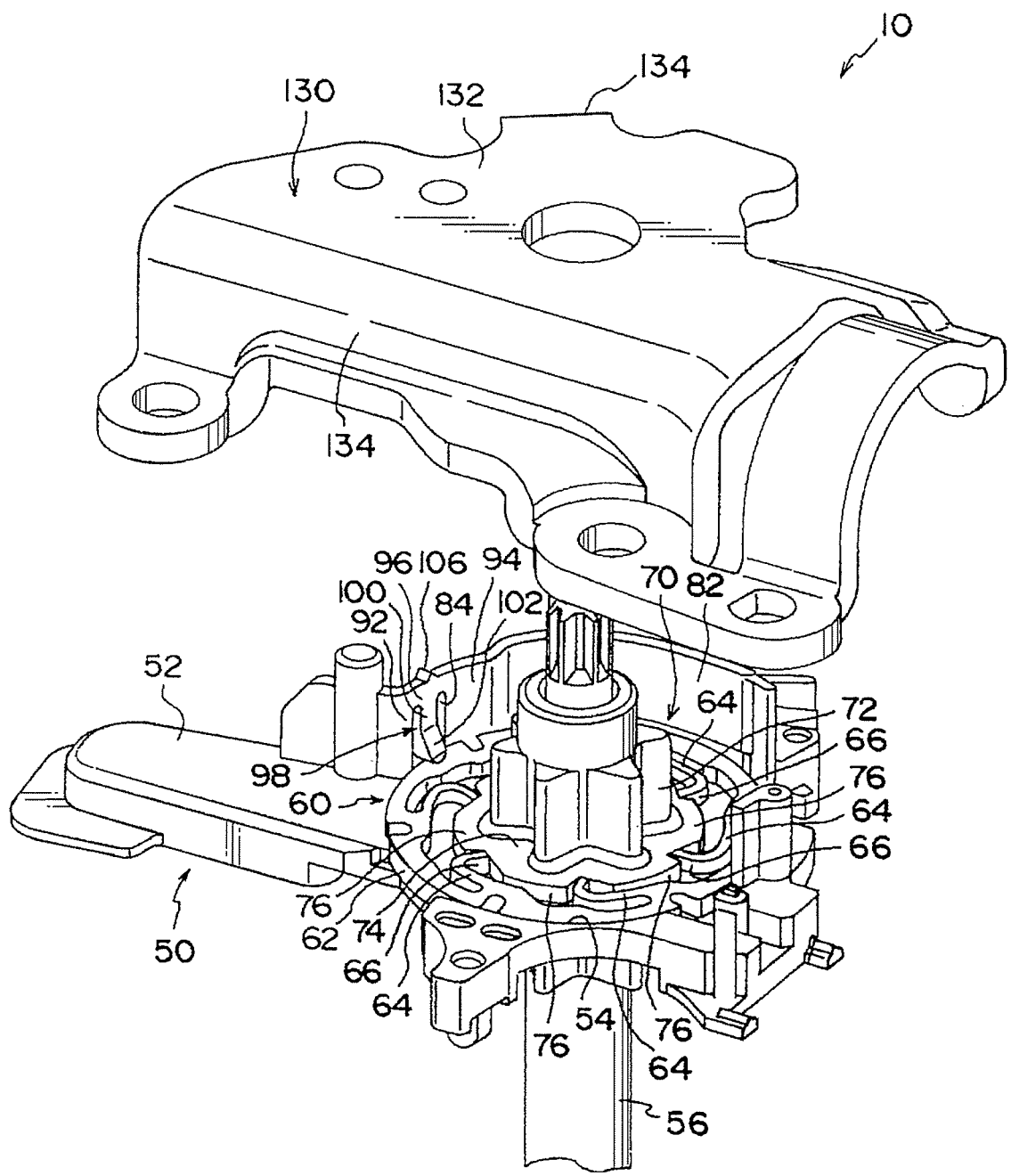
FIG. 1 is an exploded perspective view showing the configuration of relevant portions of a webbing take-up device pertaining to an embodiment of the present invention.

A case 50 serving as a base member is disposed on the outside of the leg plate 18 (on the side of the leg plate 18 that is opposite the leg plate 16 side). As shown in FIG. 1, the case 50 is equipped with a base portion 52. Coupling means configured by one or plural plug pins or fit-together claws are formed on the base portion 52 toward the side of the leg plate 18, and the coupling means are fitted into or press-fitted into fit-together holes formed in the leg plate 18, whereby the case 50 (and therefore the spool 20) is attached to the leg plate 18.

A step portion 54 is formed in the base portion 52. The inner peripheral wall of the step portion 54 generally takes as its center of curvature the central axis of the spool 20 and curves with a constant radius of curvature. Moreover, a hole portion is formed in, so as to penetrate, the bottom portion of the step portion 54, and in the torsion shaft 24, a shaft portion 56 that extends coaxially with respect to the shaft body 26 from the end portion of the fit-together projections 44 on the opposite side of the shaft body 26 side passes through a hole portion formed in the leg plate 18 and further penetrates the hole portion formed in the bottom portion of the step portion 54.

Figure 5:
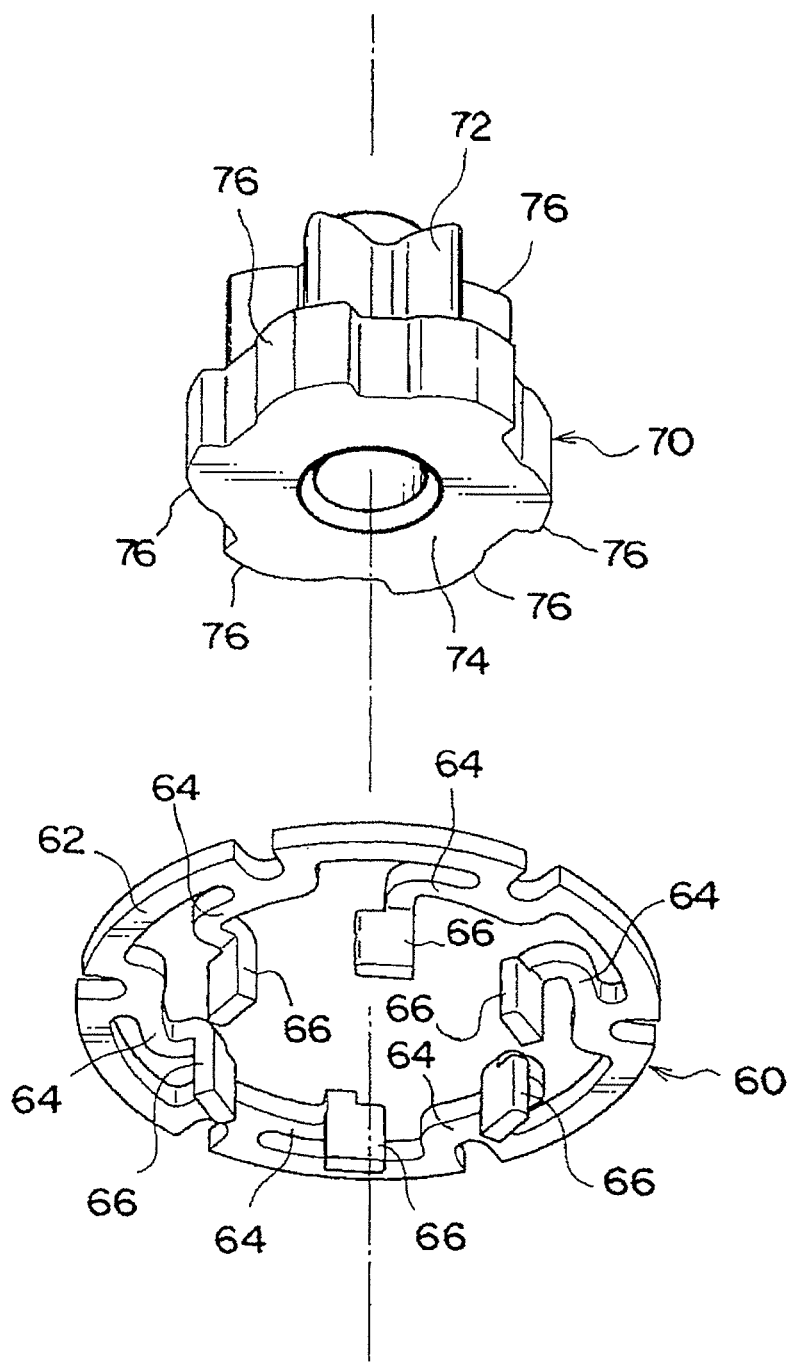
FIG. 5 is an exploded perspective view showing the configuration of a pinion and a clutch of the webbing take-up device pertaining to the embodiment of the present invention.

A clutch plate 60 serving as a held part or clutch portion is disposed inside the step portion 54. As shown in FIG. 4 and FIG. 5, the clutch plate 60 has a ring-shaped base portion 62, and the shaft portion 56 passes through the base portion 62. Plural arm portions 64 are disposed at regular intervals along the circumferential direction of the base portion 62 inside the base portion 62. The arm portions 64 are connected to the base portion 62 at their base end portions. The distal end sides of the arm portions 64 are configured as free ends and extend in the take-up direction along the inner peripheral portion of the base portion 62. Clutch claws 66 extend out from the distal ends of the plural arm portions 64 toward the lock base 32 side. The plural clutch claws 66 enter the knurled hole 38 formed in the lock base 32.

Further, a pinion 70 shown in FIG. 1 and FIG. 5 is supported such that it freely rotates on the shaft portion 56 inside the clutch plate 60. As shown in FIG. 5, the pinion 70 has a gear portion 72 whose outer peripheral shape is configured as a pinion gear. A cam portion 74 is formed coaxially and integrally with respect to the gear portion 72 on the lock base 32 side of the gear portion 72. Plural engagement teeth 76 are formed on the outer peripheral portion of the cam portion 74. The engagement teeth 76 are formed in regular intervals in the circumferential direction of the cam portion 74, and the clutch claws 66 of the clutch plate 60 fit into spaces between the engagement teeth 76 that are adjacent along the circumferential direction of the cam portion 74.

Further, the surfaces on the take-up direction side of the engagement teeth 76 are configured as slanted surfaces that face outward in the radial direction of the cam portion 74 with respect to the take-up direction, and when the pinion 70 rotates in the take-up direction, the slanted surfaces of the engagement teeth 76 interfere with the clutch claws 66 of the clutch plate 60 and press the clutch claws 66 outward in the radial direction from inside in the radial direction. Thus, when the arm portions 64 of the clutch plate 60 swing outward in the radial direction about their base end sides, the clutch claws 66 approach the inner peripheral surface of the knurled hole 38 formed in the lock base 32, and the surfaces of the clutch claws 66 engage with (bite into) a knurled surface formed in the inner peripheral surface of the knurled hole 38. Thus, the pinion 70 becomes integrally coupled to the lock base 32 via the clutch plate 60.

Figure 2A:
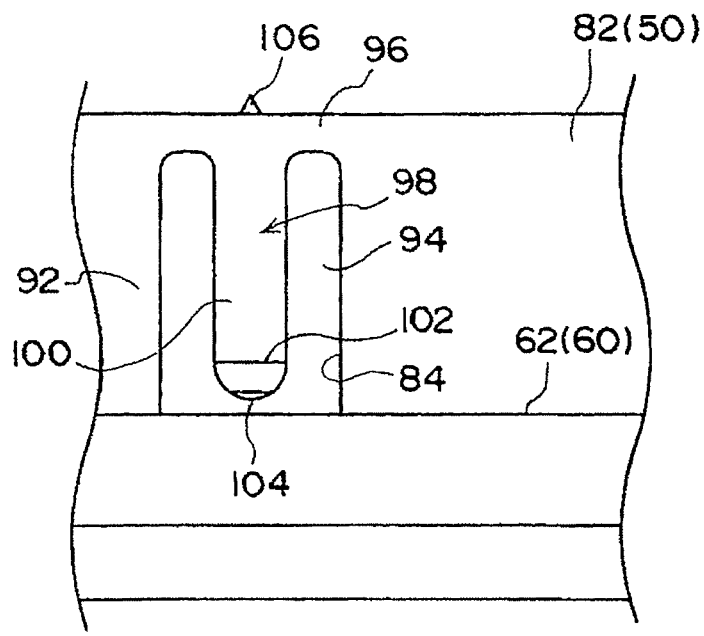
FIGS. 2A and 2B are views showing the configuration of relevant portions of the webbing take-up device pertaining to the embodiment of the present invention as seen along an opening direction of a through hole, with FIG. 2A showing a state where a pressing force is not being applied to a bridge portion and FIG. 2B showing a state where the bridge portion is being pressed by a cover such that the bridge portion has become curved.

As shown in FIG. 1, a wall portion 82 is formed in the case 50. The wall portion 82 is disposed upright from the base portion 52 toward the opposite side of the leg plate 18 side so as to follow the outer peripheral edge of the step portion 54. As shown in FIG. 1 and FIG. 2A, a through hole 84 is formed in the wall portion 82 so as to penetrate the thickness direction of the wall portion 82. Due to the through hole 84 being formed, a portion of the wall portion 82 on one side of the through hole 84 along the circumferential direction of the step portion 54 is grasped as a leg portion 92. Further, similarly, the wall portion 82 on the other side of the through hole 84 along the circumferential direction of the step portion 54 is grasped as a leg portion 94. Moreover, a portion of the wall portion 82 that interconnects the leg portion 92 and the leg portion 94 on the opposite side of the base portion 52 with respect to the through hole 84 is grasped as a bridge portion 96.

Further, a holding portion 98 is disposed between the leg portion 92 and the leg portion 94. The holding portion 98 has a coupling piece 100. The holding portion 98 is formed in a rod shape whose longitudinal direction is along the upright direction of the wall portion 82 with respect to the base portion 52, and the base end portion of the holding portion 98 is integrally connected to the bridge portion 96 at the substantial center of the bridge portion 96 along the circumferential direction of the step portion 54. A holding piece 102 is formed on the distal end of the coupling piece 100. The holding piece 102 extends from the distal end portion of the coupling piece 100 toward the base portion 52 side, and its dimension along the radial direction of the base portion 52 gradually increases as it goes toward the base portion 52 side such that the holding piece 102 projects toward the radial direction center side of the base portion 52.

Moreover, as shown in FIG. 2A, the end surface of the holding piece 102 on the opposite side of the coupling piece 100 side is configured as a touching (abutting) surface 104. The touching surface 104 curves about an axis whose axial direction is the radial direction of the step portion 54 centering on a predetermined position which is more on the coupling piece 100 side than the touching surface 104 side, and a part of the touching surface 104 (the side of the touching surface 104 located in the center in the radial direction of the step portion 54) opposes the base portion 62 of the clutch plate 60 along the direction in which the wall portion 82 is disposed upright from the base portion 52. The set position of the touching surface 104 along the direction in which the wall portion 82 is disposed upright from the base portion 52 is set such that there is a clearance between the touching surface 104 and the end surface of the clutch plate 60 placed inside the step portion 54 on the opposite side of the spool 20 side.

Further, a projection 106 serving as a projecting portion is formed on the surface of the bridge portion 96 on the opposite side of the holding portion 98 side. The projection 106 is configured in a triangular prism shape whose width dimension gradually becomes shorter away from the surface of the bridge portion 96 on the opposite side of the holding portion 98 side, and the height of the projection 106 from the surface of the bridge portion 96 on the opposite side of the holding portion 98 side (that is, the end portion of the wall portion 82 on the side in the upright direction of the wall portion 82 with respect to the base portion 52) to the distal end of the projection 106 is set to be equal to or greater than the clearance between the touching surface 104 and the end surface of the clutch plate 60 on the opposite side of the spool 20 side.

Moreover, a pretensioner 110 shown in FIG. 3 is disposed on the side of the case 50 with the configuration described above. The pretensioner 110 is equipped with a substantially circular cylinder-shaped cylinder 112. The cylinder 112 is set in an orientation where its axial direction slants about an axis whose axial direction is the thickness direction of the leg plate 18 with respect to the vertical direction of the frame 12. A gas generator 114 is mounted on the axial direction upper end portion of the cylinder 112.

The gas generator 114 is electrically connected to an unillustrated control unit (ECU), and when the control unit outputs an actuation signal with respect to the gas generator 114, a gas generating agent disposed inside the gas generator 114 is caused to combust. The gas generating agent generates gas instantaneously as a result of the gas generating agent being caused to combust. The gas generated in this manner is supplied to the inside of the cylinder 112 from the axial direction upper end of the cylinder 112 and causes the internal pressure of the cylinder 112 to rise. An unillustrated piston is housed inside the cylinder 112, and when the internal pressure of the cylinder 112 rises as described above, the piston slides (descends) toward the axial direction lower end side of the cylinder 112.

An unillustrated rack bar is integrally disposed on the piston, and when the piston descends as described above, the rack bar causes the gear portion 72 of the pinion 70 to rotate in the take-up direction.

A holder 120 is disposed on the leg plate 18 in correspondence to the cylinder 112 of the pretensioner 110. The holder 120 has a pair of leg portions 122 (in FIG. 1, only one of the leg portions 122 is shown), so that, overall, the holder 120 is formed in a general U-shape that opens toward the leg plate 18. The leg portions 122 pass through attachment holes 124 formed in the leg plate 18 in a state where the cylinder 112 has passed between both of the leg portions 122 of the holder 120. Thus, the holder 120 is attached to the leg plate 18, and the cylinder 112 is held by the holder 120 and the leg plate 18.

Moreover, a cover plate 130 that configures a pressing member is disposed as a cover on the side of the cylinder 112 that is opposite the leg plate 18 side. The cover plate 130 has a plane shape base portion 132. The base portion 132 opposes the leg plate 18, and the pinion 70, the clutch plate 60, and the rack bar of the pretensioner 110 are placed on the leg plate 18 side of the base portion 132. A leg piece 134 extends out from the outer peripheral portion of the base portion 132, and the distal end side of the leg piece 134 is fixed to the leg plate 18 by screws 136. Thus, the cover plate 130 is attached to the leg plate 18. Here, the shape of the cover plate 130, and particularly dimension of the cover plate 130 from the base portion 132 along the axial direction of the spool 20 to the portion of the leg piece 134 that is fastened and fixed to the leg plate 18, is set such that the cover plate 130 contacts (and preferably pressure-contacts) the distal end portion of the wall portion 82 (the end portion of the wall portion 82 on the opposite side of the base portion 52 side) that configures the case 50 in a state where the leg piece 134 has been fastened and fixed to the leg plate 18 by the screw 136.

<Action and Effects of Embodiment>

Next, the operation and effects of the embodiment will be described.

In the webbing take-up device 10, when the vehicle suddenly decelerates, the control unit outputs an actuation signal with respect to the gas generator 114 of the pretensioner 110. Thus, when the gas generating agent disposed inside the gas generator 114 is caused to combust, the gas generating agent instantaneously generates gas, and the gas causes the internal pressure of the cylinder 112 to rise. When the piston descends as a result of the internal pressure of the cylinder 112 rising, the rack bar integrated with the piston descends and causes the gear portion 72 of the pinion 70 to rotate in the take-up direction.

When the pinion 70 rotates in the take-up direction, the slanted surfaces of the engagement teeth 76 of the cam portion 74 of the pinion 70 interfere with the clutch claws 66 of the clutch plate 60 and press the clutch claws 66 outward in the radial direction from the inside in the radial direction. In the clutch plate 60 in this manner, the arm portions 64 swing outward in the radial direction about their base end sides, and the clutch claws 66 approach the inner peripheral surface of the knurled hole 38 formed in the lock base 32. The surfaces of the clutch claws 66 approaching the inner peripheral surface of the knurled hole 38 bite into the knurled surface that is the inner peripheral surface of the knurled hole 38.

Thus, the pinion 70 becomes integrally coupled to the lock base 32 via the clutch plate 60, and the rotation of the pinion 70 in the take-up direction is transmitted to the lock base 32 via the clutch plate 60 and causes the lock base 32 to rotate in the take-up direction.

Moreover, the lock base 32 is connected to the spool 20 such that the lock base 32 is incapable of relative rotation with respect to the spool 20 due to the torsion shaft 24, so the rotational force in the take-up direction that has been applied to the lock base 32 is transmitted to the spool 20 via the torsion shaft 24 and forcibly causes the spool 20 to rotate in the take-up direction. When the spool 20 rotates in the take-up direction in this manner, the webbing belt worn on the body of the passenger is taken up from the base end side onto the spool 20, so the body of the passenger is more strongly restrained.

Incidentally, in the webbing take-up device 10, as described above, when the leg piece 134 of the cover plate 130 is assembled to the leg plate 18 by the screws 136, the base portion 132 contacts (and preferably pressure-contacts) the distal end portion of the wall portion 82 (the end portion of the wall portion 82 on the opposite side of the base portion 52 side) that configures the case 50.

Figure 2B:
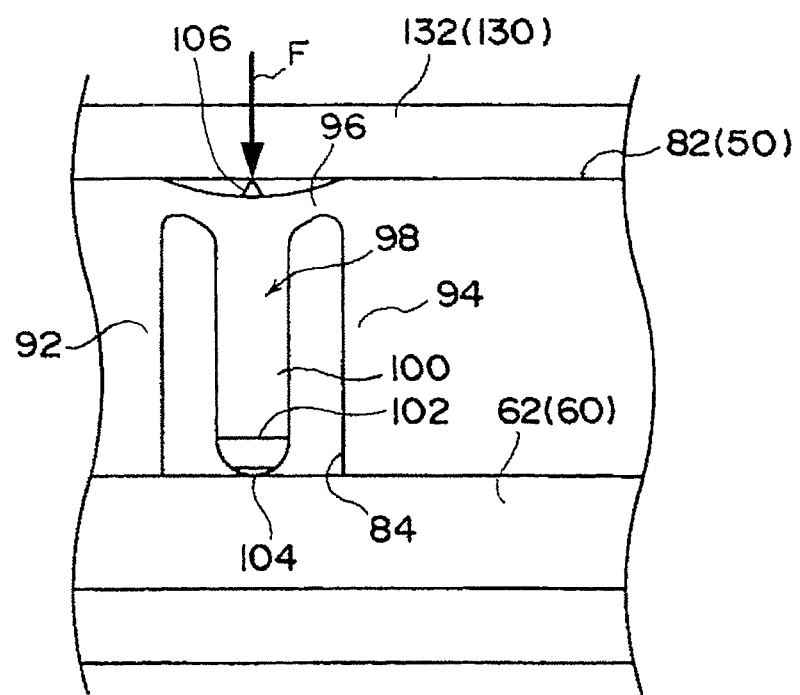

Here, in the wall portion 82 of the case 50, the projection 106 is formed on the end portion of the bridge portion 96 on the opposite side of the holding portion 98 side. For this reason, as shown in FIG. 2B, when the cover plate 130 is assembled to the leg plate 18 such that the base portion 132 contacts the distal end portion of the wall portion 82, the base portion 132 presses the projection 106 toward the leg plate 18 side (arrow F side in FIG. 2B).

In this manner, when the projection 106 receives the pressing force from the base portion 132, the intermediate portion of the bridge portion 96 whose both ends are supported by the leg portion 92 and the leg portion 94 displaces toward the leg plate 18 side such that the entire bridge portion 96 is bent (deflected) so as to open toward the side of the base portion 132. The bridge portion 96 is bent in this manner, the touching surface 104 of the holding portion 98 approaches the base portion 62 of the clutch plate 60.

Here, the projecting dimension of the projection 106 from the bridge portion 96 is equal to the size of the clearance (interval) between the touching surface 104 and the end surface of the clutch plate 60 on the opposite side of the spool 20 side along the direction in which the wall portion 82 is disposed upright from the base portion 52 (that is, along the axial direction of the spool 20) in a state before the bridge portion 96 bends. Consequently, when the cover plate 130 is assembled to the leg plate 18 such that the base portion 132 of the cover plate 130 contacts the distal end portion of the wall portion 82, at the site where the projection 106 is formed, the bridge portion 96 displaces toward the leg plate 18 side by an amount corresponding to the projecting dimension of the projection 106 from the bridge portion 96.

For this reason, the touching surface 104 of the holding portion 98 contacts the base portion 62 of the clutch plate 60 from the opposite side of the leg plate 18 side. Thus, displacement of the clutch plate 60 in the direction in which it escapes from the step portion 54 (that is, toward the base portion 132 side of the cover plate 130) is regulated. Due to such displacement of the clutch plate 60 being regulated, the size of the engage-portions between the slanted surfaces of the engagement teeth 76 of the gear portion 72 (the pinion 70) and the clutch claws 66 of the clutch plate 60 when the pinion 70 has rotated in the take-up direction can be stabilized.

Moreover, in the state before the cover plate 130 is assembled to the leg plate 18, the touching surface 104 of the holding portion 98 is away from the clutch plate 60, so assembling of the clutch plate 60 to the inside of the step portion 54 of the case 50 can be performed easily. Further, even when error arises in the dimensions of parts such as the cover plate 130 and the case 50, the projection 106 can be caused by the base portion 132 to be pressure-contacted when the cover plate 130 has been assembled to the leg plate 18, due to the projection 106 being formed projecting from the wall portion 82.

Thus, the occurrence of rattling of the case 50 or the like can be prevented or suppressed by the cover plate 130. In this manner, even when error arises in the dimensions of parts such as the cover plate 130 and the case 50, the occurrence of rattling of the case 50 or the like can be prevented or suppressed by the cover plate 130, so the degree of freedom with which the cover plate 130 and the case 50 may be designed also improves.

Moreover, as described above, the touching surface 104 of the holding portion 98 that contacts the base portion 62 of the clutch plate 60 curves about an axis whose axial direction is the radial direction of the step portion 54 centering on a predetermined position more on the coupling piece 100 side than on the touching surface 104 side. For this reason, the contact between the base portion 62 of the clutch plate 60 and the touching surface 104 of the holding portion 98 becomes linear contact, and the contact area becomes small. Thus, frictional resistance that arises between the base portion 62 of the clutch plate 60 and the touching surface 104 of the holding portion 98 when the clutch plate 60 rotates becomes small.

In the present embodiment, as described above, the touching surface 104 is configured to curve such that the contact between the base portion 62 of the clutch plate 60 and the touching surface 104 of the holding portion 98 becomes linear contact, but the touching surface 104 may also be configured to curve spherically, for example, such that the contact between the base portion 62 of the clutch plate 60 and the touching surface 104 of the holding portion 98 becomes point contact.

Further, in the present embodiment, the leg portions 92 and 94 and the bridge portion 96 are formed by forming the through hole 84 in the wall portion 82 of the case 50, but the leg portions 92 and 94 and the bridge portion 96 may also be disposed on the case 50 separately from the wall portion 82, and the leg portions 92 and 94 and the bridge portion 96 may also be configured by members separate from the case 50. However, when the leg portions 92 and 94 and the bridge portion 96 are configured as part of the case 50, an increase in the number of parts can be suppressed, and when the wall portion 82 is configured to serve as the leg portions 92 and 94 and the bridge portion 96, special space for disposing the leg portions 92 and 94 and the bridge portion 96 also becomes unnecessary.

Moreover, in the present embodiment, the base portion 132 of the cover plate 130 presses the projection 106, but a structure for pressing the projection 106 may also be attached to the leg plate 18 separately from the cover plate 130. However, when the projection 106 is pressed by the cover plate 130 for covering the case 50, an increase in the number of parts can be suppressed. Moreover, when a pressuring member that presses the projection 106 is disposed separately from the cover plate 130, space for attaching the pressing member in addition to the space for installing the cover plate 130 becomes necessary, but when the projection 106 is pressed by the cover plate 130, the special space for attaching the pressing member becomes unnecessary.

Figure 6:
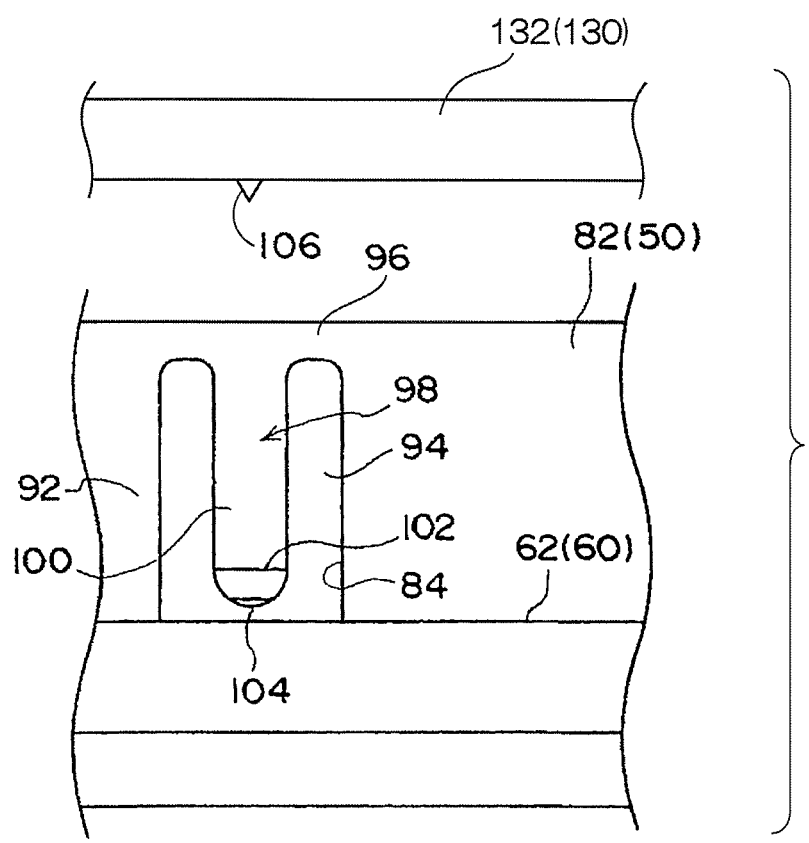
FIG. 6 is a view showing the configuration of relevant portions of the webbing take-up device pertaining to the modified embodiment of the present invention as seen along an opening direction of a through hole.

Further, in the present embodiment, the projection 106 is formed on the bridge portion 96 (that is, the wall portion 82), but the projecting portion may also be formed on the portion of the base portion 132 of the cover plate 130 that opposes the bridge portion 96 so that the projecting portion presses and causes the bridge portion 96 to bend (FIG. 6).

Moreover, in the present embodiment, displacement of the clutch plate 60 is regulated by causing the bridge portion 96 to bend such that the touching surface 104 of the holding portion 98 is caused to contact the base portion 62 of the clutch plate 60. However, even if the touching surface 104 of the holding portion 98 were away from the base portion 62 of the clutch plate 60 in the state where the bridge portion 96 has been bent, the touching surface 104 of the holding portion 98 would approach (be close to) the base portion 62 of the clutch plate 60 as compared to the state before the bridge portion 96 is bent. In this manner, it is possible to suppress displacement of the clutch plate 60 also by just the interval between the touching surface 104 and the base portion 62 narrowing.

That is, from the standpoint of the present invention, the object of the present invention can be achieved as long as the touching surface 104 of the holding portion 98 approaches the base portion 62 of the clutch plate 60 as a result of the bridge portion 96 being bent such that the interval between the touching surface 104 and the base portion 62 narrows. However, it goes without saying that displacement of the clutch plate 60 can be regulated more effectively when the touching surface 104 of the holding portion 98 contacts the base portion 62 of the clutch plate 60 in the state where the bridge portion 96 is bent.

Moreover, in the present embodiment, the present invention is applied to holding the clutch plate 60 for transmitting the rotational force of the pinion 70 to the spool 20, but from the standpoint of the first aspect of the invention, the present invention is not limited to the configured described in the present embodiment. For example, the present invention may also be applied to holding various parts that configure the lock mechanism of the webbing take-up device 10, particularly to rotating bodies that rotate when actuated.

The invention claimed is:
1. A webbing take-up device in which a spool to which a base end side of a webbing belt formed in a long band-like shape is connected rotates in a take-up direction that is one direction about an axis thereof such that the spool takes up the webbing belt from the base end side and stores the webbing belt, and in which a held part is disposed in a predetermined base member, the webbing take-up device comprising:
   a pair of leg portions that are disposed on the base member;
   a bridge portion that interconnects distal ends of the pair of leg portions and is capable of being deformed toward a base member side by a pressing force thereto from a side that is opposite from the base member;
   a holding portion that is disposed between the pair of leg portions and has a base end portion that is connected to the bridge portion and a distal end portion that opposes the held part, with a clearance of a predetermined size being formed between the distal end portion and the held part in a state where the pressing force is not being applied to the bridge portion;
   a pressing member that is attached to the base member or to a predetermined member to which the base member is attached, and that has a pressing portion that opposes the bridge portion from a side that is opposite from the holding portion in an attached state thereof; and
   a projecting portion that is formed projecting from one of the bridge portion or the pressing portion toward the other of the bridge portion or the pressing portion, that intervenes between the pressing portion and the bridge portion in the attached state of the pressing member and transmits the pressing force from the pressing portion to the bridge portion to cause the bridge portion to be bent such that the distal end portion of the holding portion approaches the held part.

2. The webbing take-up device of claim 1, wherein, in the attached state of the pressing member, the distal end portion of the holding portion contacts the held part.

3. The webbing take-up device of claim 1, wherein, a dimension of the projecting portion in an upright direction of the pair of leg portions is substantially equal to a dimension of a clearance in the upright direction of the pair of leg portions in the state where the pressing force is not being applied to the bridge portion.

4. The webbing take-up device of claim 1, wherein the distal end portion of the holding portion is configured as a curved surface that curves so as to overhang toward a side of the held part.

5. A webbing take-up device comprising:
- a spool to which a base end side of a webbing belt formed in a long band-like shape is connected and which rotates in a take-up direction that is one direction about an axis thereof to thereby take up the webbing belt from the base end side and store the webbing belt;
- a clutch portion that is disposed so as to be capable of relative rotation with respect to the spool and that is coupled directly or indirectly to the spool by rotating in a predetermined direction to apply a rotational force in the take-up direction to the spool;
- a pretensioner that causes the clutch portion to rotate in the predetermined direction by being actuated;
- a frame that directly or indirectly supports the pretensioner and the spool;
- a pair of leg portions that are disposed upright toward one side in an axis-of-rotation direction of the clutch portion and sideward in a radius-of-rotation direction of the clutch portion;
- a bridge portion that interconnects distal ends in the upright direction of the leg portions and is capable of being bent-deformed by receiving an external force in a direction from the distal end sides toward base end sides of the leg portions;
- a holding portion that is disposed between the pair of leg portions and has a base end portion that is integrally connected to the bridge portion and a distal end portion that opposes an end portion in axial direction of the clutch portion, with a clearance of a predetermined size being formed between the distal end portion and the end portion in the axial direction of the clutch portion in a state where the external force is not being applied to the bridge portion;
- a pressing member that is attached to the frame and has a pressing portion that opposes the bridge portion from a side that is opposite from the holding portion in a state where the pressing member is attached to the frame; and
- a projecting portion that is formed projecting from one of the bridge portion or the pressing portion toward the other of the bridge portion or the pressing portion, that intervenes between the pressing portion and the bridge portion in the attached state of the pressing member and transmits the pressing force from the pressing portion to the bridge portion to cause the bridge portion to be bent such that the distal end portion of the holding portion approaches the clutch portion.

6. The webbing take-up device of claim 5, wherein the distal end portion of the holding portion is configured as a curved surface that curves so as to overhang toward a side of the clutch portion.

7. The webbing take-up device of claim 5, further comprising a case that has a base portion directly or indirectly attached to the frame and a wall portion disposed upright from the base portion so as to be away from the frame along the axis-of-rotation direction of the clutch portion, with the clutch portion being housed inside the case,
wherein a through hole that penetrates the wall portion in the radius-of-rotation direction of the clutch portion is formed, the wall portion on one side of the through hole in a circumference-of-rotation direction of the clutch portion is configured as one of the pair of leg portions, the wall portion on another side of the through hole in the circumference-of-rotation direction of the clutch portion is configured as the other of the pair of leg portions, a portion of the wall portion on a side that is opposite from the base portion with respect to the through hole is configured as the bridge portion, and the holding portion is disposed inside the through hole.

8. The webbing take-up device of claim 5, further comprising:
- a case that has a base portion directly or indirectly attached to the frame and a wall portion disposed upright from the base portion so as to be away from the frame along the axis-of-rotation direction of the clutch portion, with the clutch portion being housed inside the case; and
- a cover that covers at least a part of the case from a side of the case that is opposite from the frame, that opposes the bridge portion from a side of the bridge portion that is opposite from the holding portion, and that applies to the bridge portion the pressing force that causes the bridge portion to be bent in a state where the cover is attached to the frame,
wherein the cover is configured as the pressing member.

9. The webbing take-up device of claim 5, wherein, in the attached state of the pressing member, the distal end portion of the holding portion contacts the clutch portion.

10. The webbing take-up device of claim 5, wherein, a dimension of the projecting portion in an upright direction of the pair of leg portions is substantially equal to a dimension of the clearance in the upright direction of the pair of leg portions in the state where the pressing force is not being applied to the bridge portion.

* * * * *